United States Patent
Yoon et al.

(10) Patent No.: US 7,726,158 B2
(45) Date of Patent: Jun. 1, 2010

(54) DAMPER PIN IN DRUM TYPE WASHING MACHINE

(75) Inventors: Seong No Yoon, Changwon-si (KR); Bong Sang Lee, Changwon-si (KR); Sung Rak Gong, Changwon-si (KR); Bo Yeon Kim, Changwon-si (KR); Seong Yeol Lee, Daegu (KR); Dae Hee Kwon, Busan (KR)

(73) Assignee: LG Electronics Inc., Seoul (KR)

( * ) Notice: Subject to any disclaimer, the term of this patent is extended or adjusted under 35 U.S.C. 154(b) by 530 days.

(21) Appl. No.: 10/552,961

(22) PCT Filed: May 30, 2005

(86) PCT No.: PCT/KR2005/001591

§ 371 (c)(1),
(2), (4) Date: Apr. 4, 2007

(87) PCT Pub. No.: WO2005/118937

PCT Pub. Date: Dec. 15, 2005

(65) Prior Publication Data
US 2007/0204659 A1  Sep. 6, 2007

(30) Foreign Application Priority Data

Jun. 1, 2004 (KR) .................. 10-2004-0039604
Jun. 1, 2004 (KR) .................. 10-2004-0039605

(51) Int. Cl.
*D06F 29/00* (2006.01)
*D06F 35/00* (2006.01)

(52) U.S. Cl. ............... 68/23.1; 68/23.2; 68/23.3
(58) Field of Classification Search ......... 68/23.1, 68/23.2, 23.3
See application file for complete search history.

(56) References Cited

U.S. PATENT DOCUMENTS 5,230,229 A * 7/1993 Stadelmann et al. ........ 68/23.1

FOREIGN PATENT DOCUMENTS

| EP | 0 887 456 A1 | 12/1998 |
| GB | 490718 | * 8/1937 |
| WO | WO 98/26197 | 6/1998 |

* cited by examiner

*Primary Examiner*—Michael Barr
*Assistant Examiner*—David Cormier
(74) *Attorney, Agent, or Firm*—McKenna Long & Aldridge LLP

(57) ABSTRACT

A damper pin in a drum type washing machine is disclosed. The present invention includes a cabinet forming an exterior of the drum type washing machine, a tub provided within the cabinet, a damper having one end connected to the tub and the other end rotatably connected to the cabinet, a damper pin rotatably joining the damper to the cabinet to have prescribed elasticity, and an elastic member provided within the damper pin. Therefore, the present invention prevents the damper pin from being loosened for duration, thereby reducing noise and abrasion in driving the drum type washing machine.

6 Claims, 7 Drawing Sheets

DAMPER PIN IN DRUM TYPE WASHING MACHINE

This application claims the benefit of International Application No. PCT/KR2005/001591, filed on May 30, 2005 and Korean Application No. 2004-0039604, filed on Jun. 1, 2004 and Korean Application No. 2004-0039605, filed on Jun. 1, 2004, which is hereby incorporated by reference as if fully set forth herein.

TECHNICAL FIELD

The present invention relates to a drum type washing machine, and more particularly, to a damper pin used in assembling a damper within a drum type washing machine.

BACKGROUND ART

Generally, a washing machine is a device for performing a washing function in a manner of rotating a drum rotatably provided within a tub by a motor. In this case, the tub receives water therein and laundry, water and detergent are held within the drum. Washing machines are classified into an upright type, a drum type and the like according to a rotational shaft direction of the drum. In the following description, the drum type washing machine is explained.

FIG. 1 is a cross-sectional diagram of a drum type washing machine according to a related art.

Referring to FIG. 1, a drum type washing machine according to a related art consists of a cabinet 300 having an opening at its front side, a tub 5 provided within the opening to receive water therein, a drum 4 provided within the tub 5 and having a rotational axis arranged in a horizontal direction to be connected to a rotational shaft of a motor, and a suspension assembly provided between an outer sidewall of the tub 5 and the cabinet 300 to reduce vibration generated from an activated washing operation.

In this case, the suspension assembly, as shown in FIG. 1, generally consists of a plurality of springs 700 and dampers 500 connected between the tub 5 and the cabinet 300. Specifically, the damper 500 having a cylinder structure is rotatably provided under the tub 5.

FIG. 2 is an exploded perspective diagram of a damper to be assembled to a cabinet of a drum type washing machine according to a related art.

Referring to FIG. 2, first of all, after an insertion hole 501 of an insertion piece 502 of a damper 500 is aligned to a fixing hole 801 of a fixing piece 800 provided to an inside of a cabinet 300, a damper pin 100 is fitted in the fixing hole 801 and the insertion hole 501.

Meanwhile, the damper pin 100 is formed of a material having prescribed elasticity. A central part of the damper pin 100 configures a body part 101 having a long cylindrical shape to be loaded in the fixing hole 801 and the insertion hole 501.

A hanging sill 103 is provided to a circumference of one end of the body part 101 to sustain a rotatably joined state between the damper 500 and the fixing piece 800 by the damper pin 100, and the other end of the body part 101 is taper to facilitate its insertion in the fixing hole 801 and the insertion hole 501.

A hanging piece 102 is provided to the body part 101 of the damper pin 100 in a direction opposite to the hanging sill 103 to prevent the inserted damper pin 100 from being separated from the fixing piece and the damper 500. A slot 105 is formed along a lateral side of the body part 101 so that the damper pin 100 can shrink to reduce its thickness for insertion facilitation in inserting the damper pin 100 in the fixing hole 801 and the insertion hole 501.

In the above-configured damper pin 100, the material of the damper pin 100 is fatigued with the vibration and the like applied to the damper pin 100 in operating the washing machine. Once the fatigue is accumulated for a predetermined time, elasticity of the damper pin 100 is weakened and a width of the slot 105 is reduced.

If so, a size of the damper pin 100 inserted in the fixing hole 801 and the insertion hole 501 becomes loosened to bring about a shaking phenomenon between the fixing hole 801 and the insertion hole 501 due to the vibration and the like generated from driving the drum type washing machine. And, the shaking phenomenon of the damper pin 100 brings about vibration and noise in performing a washing process.

And, the damper pin 100 fitted in the fixing and insertion holes 801 and 501 is abraded by the friction of its rotational movement.

Therefore, it is important to improve the structure of the damper pin to prevent the damper pin from losing its elasticity.

DISCLOSURE

Technical Problem

Accordingly, the present invention is directed to a damper pin that substantially obviates one or more of the problems due to limitations and disadvantages of the related art.

An object of the present invention is to provide a damper pin, by which vibration and noise are prevented from increasing in driving a washing machine due to transformation and abrasion of the damper pin used for duration.

Technical Solution

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a drum type washing machine according to the present invention includes a cabinet forming an exterior of the drum type washing machine, a tub provided within the cabinet, a damper having one end connected to the tub and the other end rotatably connected to the cabinet, a damper pin rotatably joining the damper to the cabinet to have prescribed elasticity, and an elastic member provided within the damper pin.

To further achieve these and other advantages and in accordance with the purpose of the present invention, a drum type washing machine includes a cabinet forming an exterior of the drum type washing machine, a tub provided within the cabinet, a damper having one end connected to the tub and the other end rotatably connected to the cabinet, a damper pin rotatably joining the damper to the cabinet to have a slot along a lateral side of the damper pin, and a felter provided within the damper pin.

It is to be understood that both the foregoing general description and the following detailed description are exemplary and explanatory and are intended to provide further explanation of the invention as claimed.

Advantageous Effects

Accordingly, the present invention has inserts the elastic member such as the rubber, spring and the like in the damper pin that rotatably fixes the damper to have the elastic member support the inside of the damper pin. Hence, the width of the slot provided to the damper pin can be prevented from being reduced despite duration.

And, the present invention inserts the felter impregnated with the oil or grease in the damper pin. Hence, the oil or grease leaks to prevent the abrasion of the damper pin due to the rotation of the damper in driving the drum type washing machine. And, the oil or grease is absorbed in the felter in stopping driving the drum type washing machine, whereby it is able to prevent the waste of the oil or grease.

Therefore, the present invention prevents the shaking phenomenon of the loosened damper pin attributed to the vibration and the like generated from driving the drum type washing machine. Furthermore, the present invention prevents the vibration and noise from being generated from performing the washing process.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings.

BEST MODE

Reference will now be made in detail to the preferred embodiments of the present invention, examples of which are illustrated in the accompanying drawings.

First of all, the present invention is characterized in preventing a damper pin, which is provided to a tub to join a damper absorbing vibration of a tub to a cabinet forming an exterior, from being loosened in driving a drum type washing machine.

Secondly, the present invention is characterized in preventing a backlash between a damper and a damper pin to suppress dewatering vibration and noise.

Thirdly, the present invention is characterized in enabling a role of lubrication by providing a felter impregnated with oil and grease in a damper pin.

First of all, a configuration of a damper pin in a drum type washing machine according to a first embodiment of the present invention is explained with reference to FIG. 4 and FIG. 5 as follows.

Figure 1:
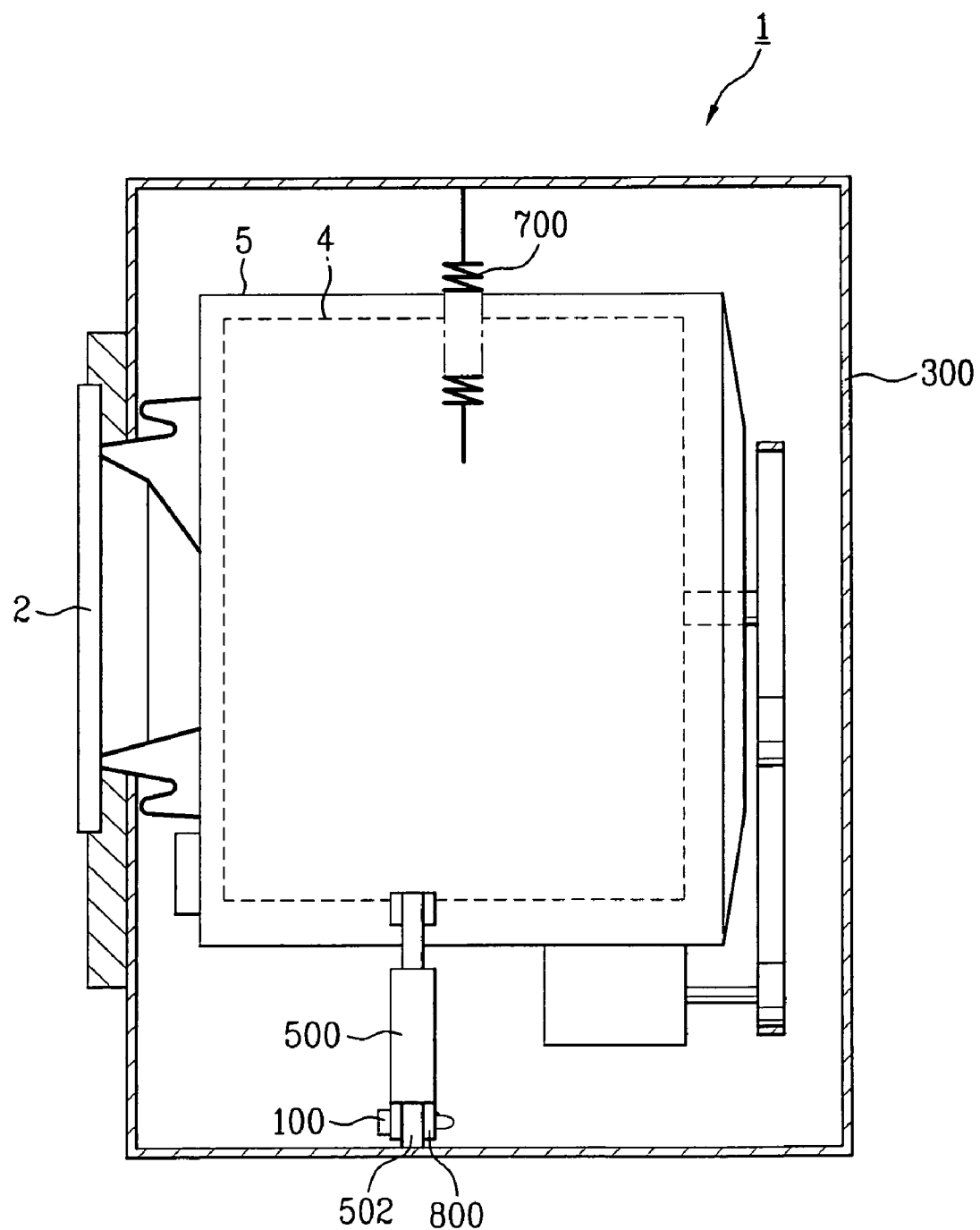
FIG. 1 is a cross-sectional diagram of a drum type washing machine according to a related art.
Figure 2:
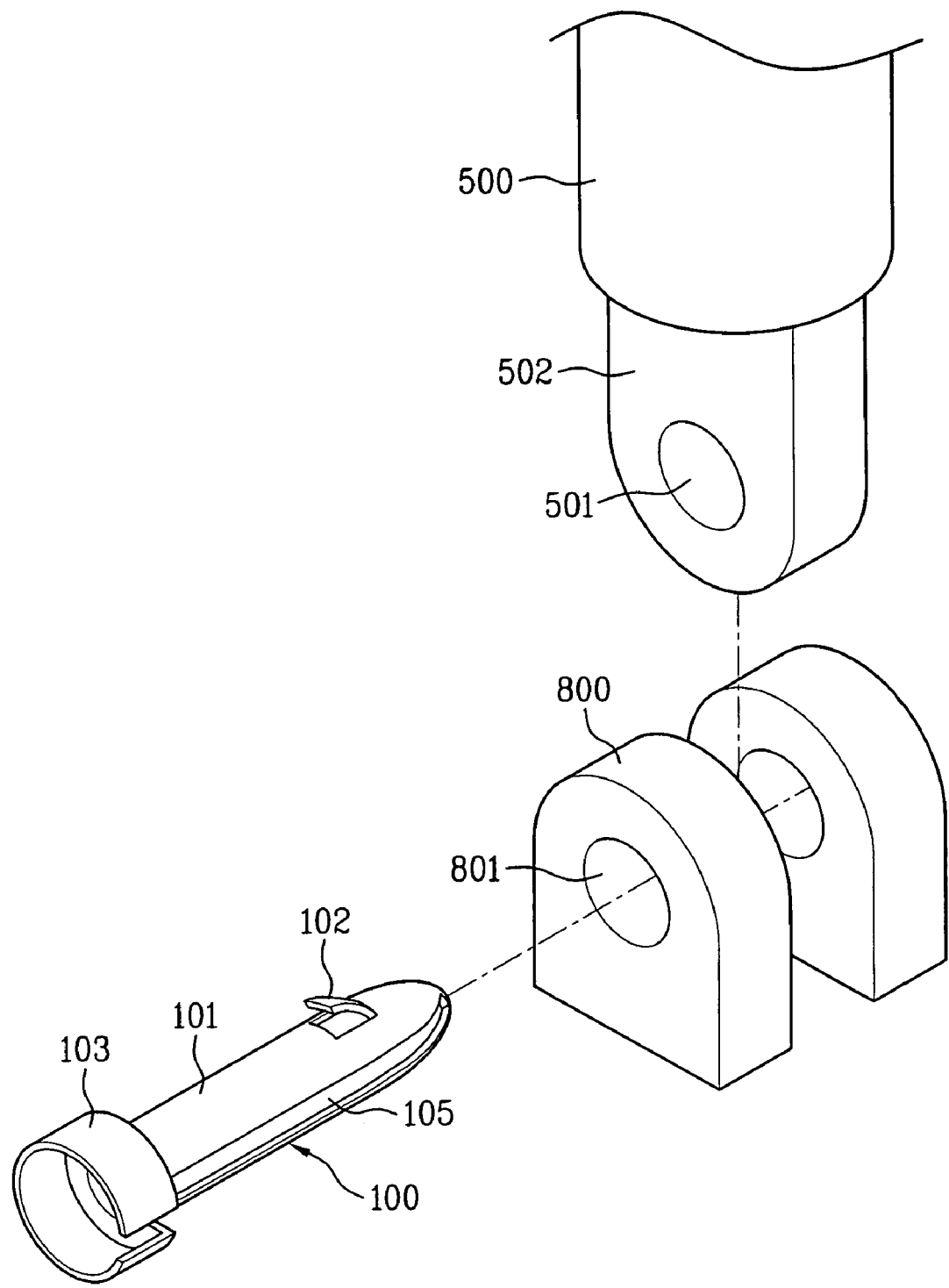
FIG. 2 is an exploded perspective diagram of a damper and a damper pin in a drum type washing machine according to a related art.
Figure 3:
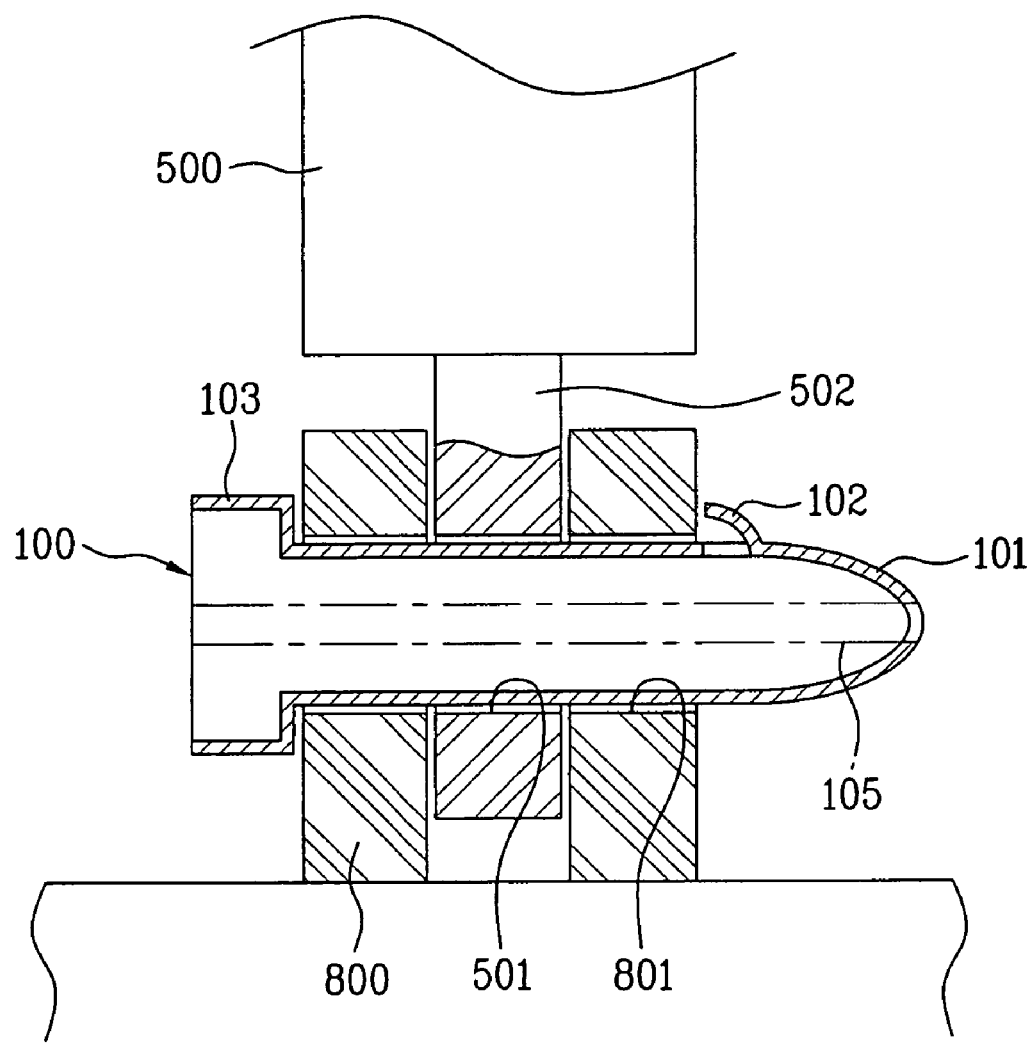
FIG. 3 is a cross-sectional diagram of a damper and a damper pin in a drum type washing machine according to a related art.
Figure 4:
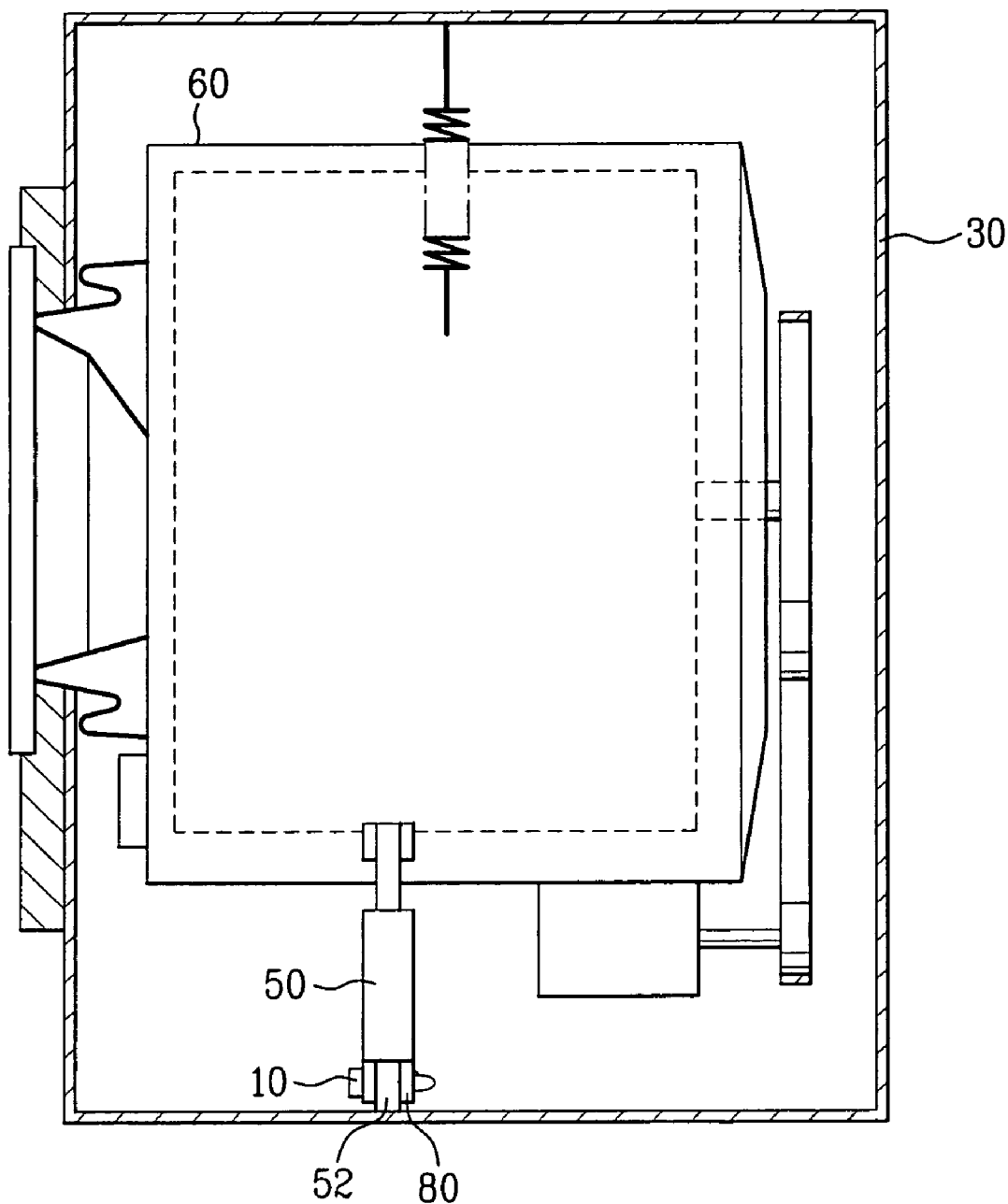
FIG. 4 is a cross-sectional diagram of a damper joined to a tub of a drum type washing machine according to an embodiment of the present invention.
Figure 5:
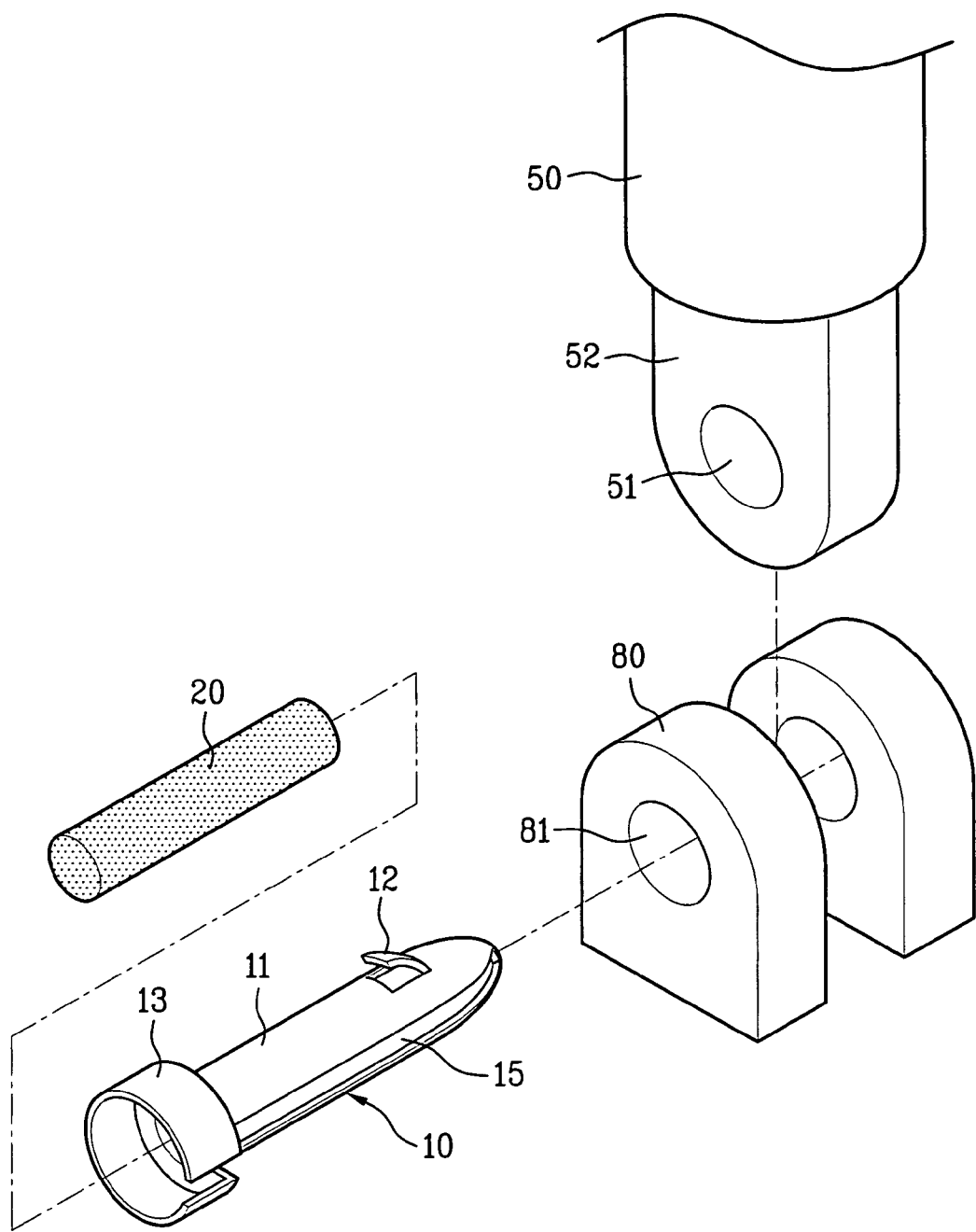
FIG. 5 is an exploded perspective diagram of a damper and a damper pin in a drum type washing machine according to an embodiment of the present invention.

FIG. 4 is a cross-sectional diagram of a damper joined to a tub of a drum type washing machine according to an embodiment of the present invention and FIG. 5 is an exploded perspective diagram of a damper and a damper pin in a drum type washing machine according to an embodiment of the present invention.

Referring to FIG. 4, a drum type washing machine according to an embodiment of the present invention includes a cabinet 30 forming an exterior, a tub 60 provided within the cabinet 30, a damper 50 having one end joined to the tub 60 and the other end rotatably joined to the cabinet 30, and a damper pin 10 rotatably joining the damper 50 to the cabinet 30 to have prescribed elasticity.

In this case, the damper pin 10 includes a plastic-based elastic member in general. Referring to FIG. 5, the damper pin 10 includes a long cylindrical body part 11 and a hanging sill 13 externally protruding from a circumference of one end of the body part 11.

And, the other end of the body part 11 of the damper pin 10 is tapered in a direction opposite to the hanging sill 13 to facilitate the body part 11 to be inserted in a fixing hole 81 formed at a fixing piece 80 of the cabinet 30 and an insertion hole 51 formed at an insertion piece 52 of a damper 50.

Moreover, a hanging piece 12 is provided to the body part 11 to oppose the hanging sill 13. One side of the hanging piece 12 is projected, whereby the damper pin 10 inserted in the fixing hole 81 of the cabinet 30 and the insertion hole 51 of the damper 50 is prevented from separated from the holes 81 and 51.

Figure 6:
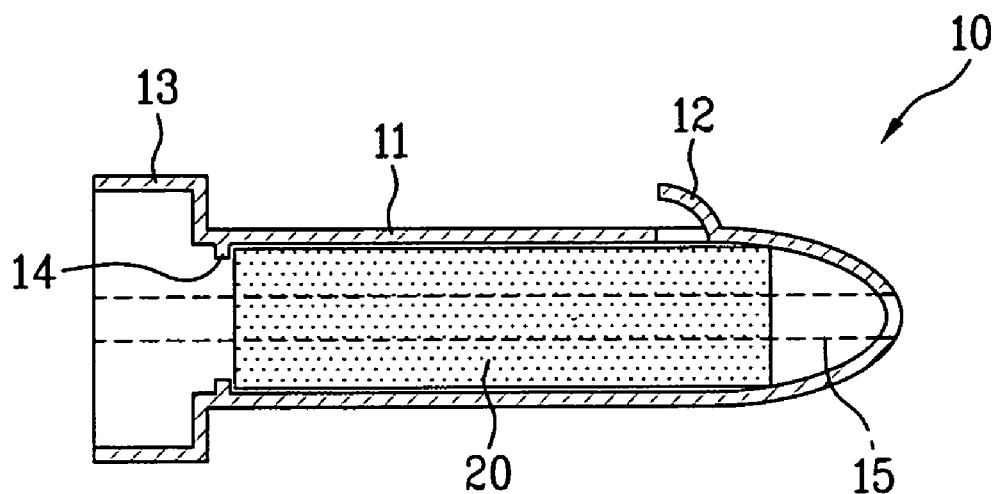
FIG. 6 is a cross-sectional structural diagram of a damper pin according to a first embodiment of the present invention.

The damper pin 10, as shown in FIG. 5 and FIG. 6, has a slot 15 formed along its lateral side. And, a rubber 20 is inserted as an elastic member inside the damper pin 10.

Preferably, a stopper 14 is provided to an inside of the damper pin 10 to prevent the rubber 20 from moving within the damper pin 10 and to prevent the rubber 20 from being separated from the damper pin 10.

An operation of the above-configured damper pin according to the first embodiment of the present invention is explained as follows.

Referring to FIG. 5 and FIG. 6, the damper pin 10 is aligned to the insertion hole 51 of the damper 50 and the fixing hole 81 of the fixing piece 80 of the cabinet 30. The damper pin 10 is then fitted in both of the fixing hole 81 and the insertion hole 51 to penetrate.

In doing so, when the damper pin 10, which is made of a material having prescribed elasticity, is penetrating the fixing hole 81 and the insertion hole 51, the body part 11 of the damper pin 10 having the hanging piece 12 and the slot 15 shrinks to be inserted in the fixing hole 81 or the insertion hole 51. After having been inserted in the fixing hole 81 and the insertion hole 51, the body part 11 and the hanging piece 12 are spread as they are.

Thus, once the damper pin 10 completely penetrates the fixing hole 81 and the insertion hole 51, the hanging sill 13 and the hanging piece 12 provided to both sides of the damper pin 10 prevent the damper pin 10 from being separated from the fixing or insertion hole 81 or 51.

The above-installed damper 50 is configured rotatable to the tub 60 and plays a role as a suspension in driving the drum type washing machine.

Meanwhile, fatigue is accumulated on the elastic material based damper pin 10 in operating the washing machine. Once the fatigue is accumulated for a predetermined time, elasticity of the damper pin 10 is weakened so that a width of the slot 15 provided to the lateral side of the damper pin 10 may be gradually reduced. Yet, as the rubber 20 provided within the damper pin 10 as the elastic member supports the damper pin 10, it is able to prevent the width of the slot 15 from being reduced.

Thus, since the width of the slot 15 can be prevented from being decreased, it is able to prevent the damper pin 10 fitted in the fixing and insertion holes 81 and 51 from being loosened.

Figure 7:
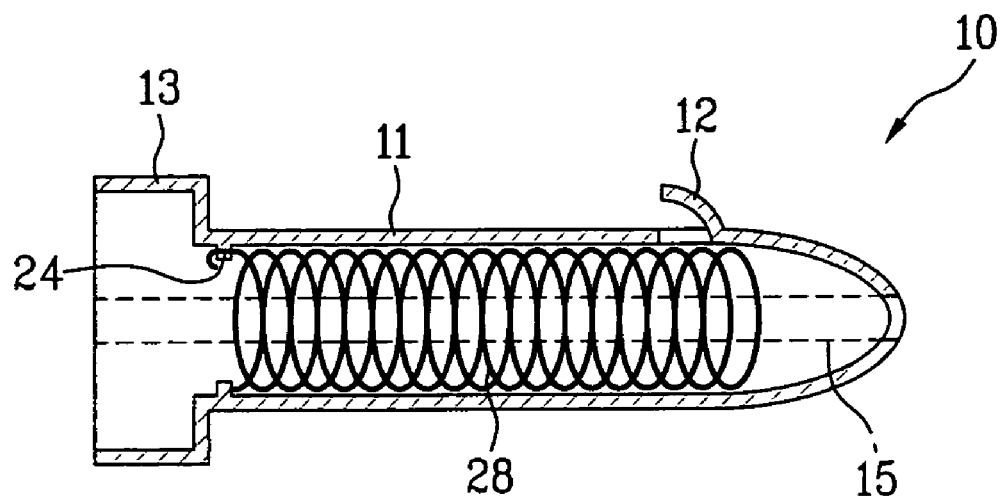
FIG. 7 is a cross-sectional structural diagram of a damper pin according to a second embodiment of the present invention.

FIG. 7 is a cross-sectional structural diagram of a damper pin according to a second embodiment of the present invention.

Referring to FIG. 7, a spring 28 is inserted as an elastic member in a damper pin 10.

Namely, as mentioned in the first embodiment of the present invention, the damper pin 10 includes a long cylindrical body part 11 and a hanging sill 13 externally protruding from a circumference of one end of the body part 11.

And, the other end of the body part 11 of the damper pin 10 is tapered in a direction opposite to the hanging sill 13 to facilitate the body part 11 to be inserted in a fixing hole 81 formed at a fixing piece 80 of the cabinet 30 and an insertion hole 51 formed at an insertion piece 52 of a damper 50.

Moreover, a hanging piece 12 is provided to the body part 11 to oppose the hanging sill 13. One side of the hanging piece 12 is projected, whereby the damper pin 10 inserted in the fixing hole 81 of the cabinet 30 and the insertion hole 51 of the damper 50 is prevented from separated from the holes 81 and 51.

And, the damper pin 10 has a slot 15 formed along its lateral side.

Meanwhile, a spring 28 is provided as an elastic member within the damper pin 10.

And, the spring 28 includes a coil spring.

Preferably, a stopper 14, as shown in FIG. 7, is provided to an inside of the damper pin 10 to prevent the spring 28 from moving within the damper pin 10 and to prevent the spring 28 from being separated from the damper pin 10.

An operation of the above-configured damper pin according to the second embodiment of the present invention is explained as follows.

First of all, the elasticity of the damper pin 10 may be weakened as time goes by. Yet, the restoring force of the spring 28 can prevent the slot 15 from being narrowed.

Figure 8:
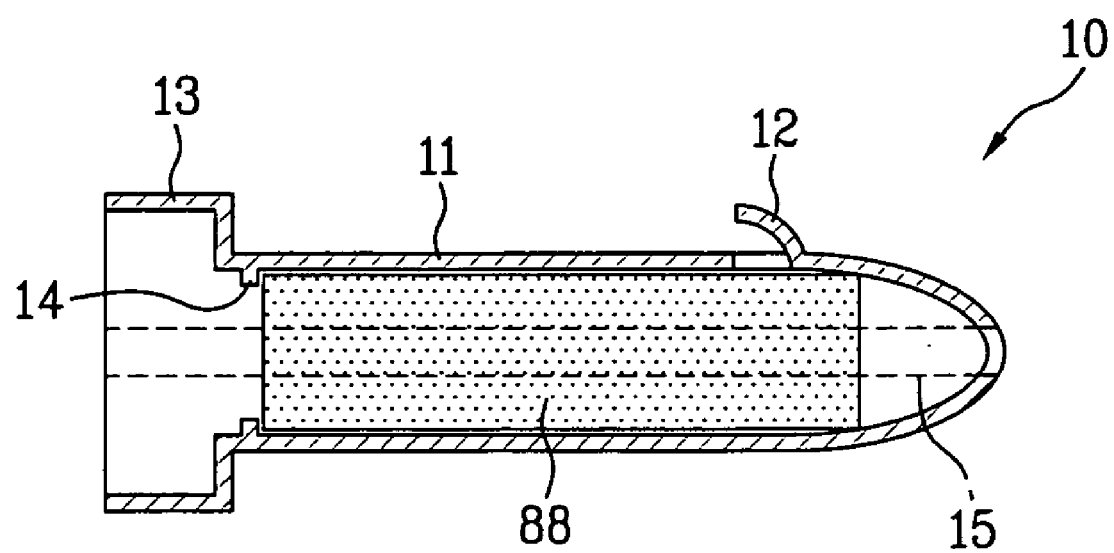
FIG. 8 is a cross-sectional structural diagram of a damper pin according to a third embodiment of the present invention.

FIG. 8 is a cross-sectional structural diagram of a damper pin according to a third embodiment of the present invention.

Referring to FIG. 8, a drum type washing machine according to a third embodiment of the present invention includes a cabinet 30 forming an exterior, a tub 60 provided within the cabinet 30, a damper 50 having one end joined to the tub 60 and the other end rotatably joined to the cabinet 30, a damper pin 10 rotatably joining the damper 50 to the cabinet 30 and having a slot 15 along its lateral side, and a felter 88 inserted in the damper pin 10.

In the third embodiment of the present invention, the damper pin 10 includes a long cylindrical body part 11 and a hanging sill 13 externally protruding from a circumference of one end of the body part 11.

And, the other end of the body part 11 of the damper pin 10 is tapered in a direction opposite to the hanging sill 13 to facilitate the body part 11 to be inserted in a fixing hole 81 formed at a fixing piece 80 of the cabinet 30 and an insertion hole 51 formed at an insertion piece 52 of a damper 50.

Moreover, a hanging piece 12 is provided to the body part 11 to oppose the hanging sill 13. One side of the hanging piece 12 is projected, whereby the damper pin 10 inserted in the fixing hole 81 of the cabinet 30 and the insertion hole 51 of the damper 50 is prevented from separated from the holes 81 and 51.

The damper pin 10 is formed of a material having prescribed elasticity and has a slot 15 formed along its lateral side. And, the felter 88 is inserted inside the damper pin 10.

And, the felter 22 is impregnated with oil or grease as a lubricant.

Meanwhile, a stopper 14 is provided to an inside of the damper pin 10 to prevent the felter 88 from moving within the damper pin 10 and to prevent the felter 88 from being externally separated from the damper pin 10.

An operation of the above-configured damper pin according to the third embodiment of the present invention is explained as follows.

First of all, the damper pin 10 is aligned to the insertion hole 51 of the insertion piece 52 of the damper 50 and the fixing hole 81 of the fixing piece 80 of the cabinet 30. The damper pin 10 is then fitted in both of the fixing hole 81 and the insertion hole 51 to penetrate.

The above-installed damper 50 is configured rotatable to the tub 60 and plays a role as a suspension in driving the drum type washing machine.

Meanwhile, since the felter 88 is provided within the damper pin 10 of the present invention and since the felter 88 is impregnated with the oil or grease as the lubricant, a temperature of the damper pin 10 is raised by the rotation of the drum and the vibration of the damper in driving the drum type washing machine.

In this case, the oil or grease is coated on a surface of the body part 11 of the damper pin 10 to prevent the temperature from rising and to reduce the noise or abrasion.

On the other hand, in case of stopping driving the drum type washing machine, the temperature is lowered so that the oil or grease coated on the surface of the body part 11 of the damper pin 10 is absorbed in the felter 88 again. Hence, it is able to prevent the waste of the oil or grease.

INDUSTRIAL APPLICABILITY

Accordingly, the present invention has inserts the elastic member such as the rubber, spring and the like in the damper pin that rotatably fixes the damper to have the elastic member support the inside of the damper pin. Hence, the width of the slot provided to the damper pin can be prevented from being reduced despite duration.

And, the present invention inserts the felter impregnated with the oil or grease in the damper pin. Hence, the oil or grease leaks to prevent the abrasion of the damper pin due to the rotation of the damper in driving the drum type washing machine. And, the oil or grease is absorbed in the felter in stopping driving the drum type washing machine, whereby it is able to prevent the waste of the oil or grease.

Therefore, the present invention prevents the shaking phenomenon of the loosened damper pin attributed to the vibration and the like generated from driving the drum type washing machine. Furthermore, the present invention prevents the vibration and noise from being generated from performing the washing process.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A drum type washing machine comprising:
   a cabinet forming an exterior of the drum type washing machine;
   a tub provided within the cabinet;
   a damper having one end connected to the tub and the other end rotatably connected to the cabinet;
   a damper pin rotatably joining the damper to the cabinet, the damper pin having a slot formed along a lateral side thereof; and
   a felt provided within the damper pin,
   wherein the felt is impregnated with a lubricant.

2. The drum type washing machine of claim 1, wherein the lubricant is an oil.

3. The drum type washing machine of claim 1, wherein the lubricant is a grease.

4. The drum type washing machine of claim 1, wherein a hanging sill is provided to one side of the damper pin and a hanging piece is provided to the other side of the damper pin to prevent the damper pin from being separated.

5. The drum type washing machine of claim 4, wherein the hanging piece is formed as one body with the damper pin.

6. The drum type washing machine of claim 4, wherein the hanging piece has a predetermined elasticity.

* * * * *